United States Patent Office 3,314,920
Patented Apr. 18, 1967

3,314,920
POLYESTER COMPOSITIONS HAVING
IMPROVED DYEABILITY
Ryoichi Sakurai, Shigemitsu Tsunawaki, Kiyoshi Nawata, Takeo Shima, and Iwao Fujimoto, all of Iwakuni-shi, Yamaguchi-ken, Japan, assignors to Teikoku Jinzo Kenshi Kabushiki Kaisha, Osaka, Japan, a corporation of Japan
No Drawing. Filed July 11, 1961, Ser. No. 123,963
Claims priority, application Japan, July 19, 1960, 35/31,564; Oct. 6, 1960, 35/40,931; Nov. 8, 1960, 35/44,862
2 Claims. (Cl. 260—75)

This invention relates to polyester compositions. More particularly, the invention relates to polyester compositions that have been mixed with organo sulfonic acid esters.

Heretofore, the preparation of polyesters from dibasic acids and dihydric alcohols is well known. Polyesters which consist of one or more of the aliphatic dicarboxylic acids, for example succinic acid, adipic acid, sebacic acid, etc. and aromatic dicarboxylic acids such as, for example, terephthalic acid, isophthalic acid, diphenyl dicarboxylic acids, naphthalene dicarboxylic acids, diphenylether dicarboxylic acids, diphenylsulfone dicarboxylic acids, diphenylmethane dicarboxylic acids, diphenoxyethane dicarboxylic acids, etc.; and one or more of the aliphatic glycols such as, for example, ethylene glycol, trimethylene glycol, propylene glycol, butylene glycol, diethylene glycol and triethylene glycol; the alicyclic glycols such as, for example, cyclohexane diol, 1,4-dihydroxymethyl cyclohexane, etc. are known. Among these, the polyesters that are obtained by the reaction of the dibasic acids such as, for example, terephthalic acid, isophthalic acid, etc. with the dihydric alcohols such as, for example, ethylene glycol or 1,4-hydroxy methyl cyclohexane; and those obtained by the self-condensation of oxycarboxylic acids such as p-β-hydroxyethoxy-benzoic acid and β-hydroxyethoxy-vanillic acid are well known as possessing great value commercially as fibers or films.

The polycarbonates that are obtained by the reaction of dihydric alcohols such as, for example, ethylene glycol, propylene glycol and trimethylene glycol, or divalent phenols such as, for example, hydroquinone, "Bisphenol-A," etc. with carbonic acid derivatives such as, for example phosgene or diphenylcarbonate are also known as a type of polyester.

In the present specification, these various polyesters and modified polyesters shall be hereafter collectively called "polyesters."

The fibers and films obtained from these polyesters possess, for example, high degrees of crystallinity, and high softening points as well as excellent properties as regards their chemical resistance, heat stability, photo-stability, tenacity, Young's modulus, etc.

On the other hand, the polyesters possess faults that offset the aforementioned advantages such as their poor dyeability and the fact that they pill easily. Hence, notwithstanding their excellent properties, as set forth above, limitations are imposed on their wide use.

It is an object of the present invention to provide polyester compositions possessing tenacity and elongation to an extent as to fit them for normal clothing and industrial uses, and moreover having high affinity for dispersed dyes.

Another object of the invention is to provide polyester compositions having antipilling properties.

Other objects and advantages of the invention will be apparent from a consideration of the following detailed description.

The objects and advantages of the present invention, as described hereinabove, are achieved by adding to a polyester a minor amount of a compound which is miscible with the polyester and has at least one sulfonic acid ester bond in its molecule but has no ester-forming functional group in its molecule.

A preferred compound suitable for the above purpose is an organo sulfonic acid ester selected from the group consisting of those having the formulae:

   (I)

$$A\text{—}Z(X'\text{—}Z\text{—})_m A' \quad \text{(II)}$$

$$A\text{—}Z\text{—}(X'\text{—}Z'\text{—}Y'\text{—}Z''\text{—})_m A' \quad \text{(III)}$$

groups which do not possess an ester-forming functional wherein X, Y, A, A', X' and Y' are all organic residual groups which do not possess as ester-forming functional group, and A and A', and X' and Y' may be the same as or different from each other; and Z, Z' and Z'' are each selected from the group consisting of the following radicals:

(a) —O—SO$_2$— and (b) —SO$_2$—O— and may be the same or different; $n$ is an integer of 1, 2, 3 and 4, and in case $n$ is 1, X and Y may be the same or different organic residual groups, and if $n$ is 2 or more, X may be the same or different organic residual groups; $m$ is a positive integer from 1 to 10; also when $X'=Y'$ in the above Formula III, such cases should be excluded wherein Z, Z' and Z'' are all radical (a) or radical (b).

Further "ester-forming functional group" in the above refers to a group which is substantially capable of forming an ester such as hydroxyl group, phenolic hydroxyl group, carboxylic group and carboxylic acid ester group.

When Z is the radical (a), i.e., —O—SO$_2$—, in the aforementioned Formula I, the organic sulfonic acid ester used in the present invention has the following formula:

   (Ia)

and when Z is the radical (b), i.e., —SO$_2$—O—, it has the formula:

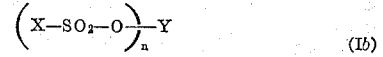   (Ib)

And, as X and Y are both organic radicals, in case $n=1$, the aforementioned Formulae Ia and Ib will represent identical group of compounds.

In Formula II when Z is (a), i.e., —O—SO$_2$—, and when it is (b), i.e., —SO$_2$—O—, both cases having the following formula become the same.

$$A\text{—}O\text{—}SO_2\text{—}(X'\text{—}O\text{—}SO_2\text{—})_m A'$$

In Formula III when $X'=Y'$ and the Z, Z' and Z'' are all either (a) or (b), i.e., —O—SO$_2$— or —SO$_2$—O—, the same compounds as in Formula II will be indicated.

In the Formulae I, II, and III, the organic residual groups having no ester-forming functional group, represented by A, A', X, Y, X' and Y' may be any of aliphatic, alicyclic and aromatic residual groups, and these organic residual groups may have any substituent groups so far as they are not ester-forming functional groups.

The value of $n$ in Formula I, considered from the standpoint of the ease of synthesis, is suitably from 1 to 4, while in Formulae II and III the value of $m$ is suitably from 1 to 10 for the same reason. In all of the compounds represented by the Formulae I, II and III, above, a greater part thereof dissolve in a polymer without being introduced into the polymer chain in a chemically bonded state.

A method of preparing the compounds of the aforementioned Formulae Ia and Ib, is as follows: react in the presence of an alkali a sulfonyl halogenide selected depending upon the desired organic radicals X and Y with alcohols or phenols, and pour the obtained reaction mixture into, for example, water, compounds of the aforementioned Formulae Ia and Ib are separated.

As typical examples of the compounds of the aforementioned Formula I (Formulae Ia and Ib) that are used as additives in the present invention, the following, for example, may be named:

(1) Compounds belonging to Formula I (when $n=1$):
p-tolyl p-toluenesulfonate
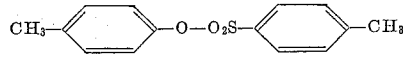
p-chlorophenyl benzenesulfonate
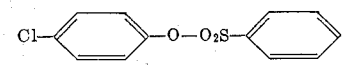
methyl p-toluenesulfonate
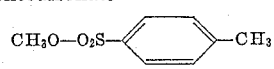
lauryl cyclohexanesulfonate
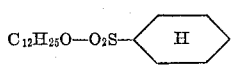
lauryl methanesulfonate
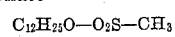
cyclohexyl p-toluenesulfonate
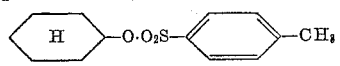
β-naphthyl p-toluenesulfonate
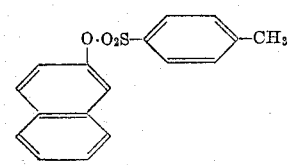
p-phenylphenyl benzenesulfonate
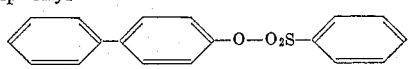
p-phenylphenyl diphenylsulfonate
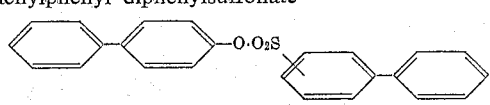
phenyl diphenylsulfonate
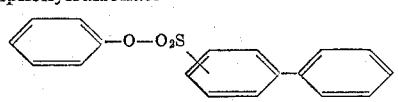
n-hexyl β-naphthalenesulfonate
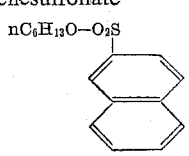
p-phenylphenyl 3-sodiumsulfobenzenesulfonate
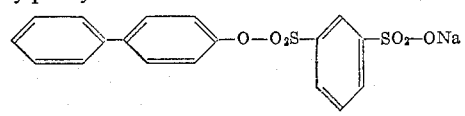

p-lithiumsulfophenyl 4-diphenylsulfonate
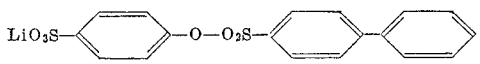

Compounds belonging to Formula Ia (when $n=2$):
diphenyl benzene-m-disulfonate
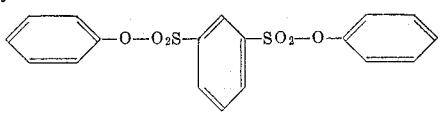

di-p-phenylphenyl benzene-m-disulfonate
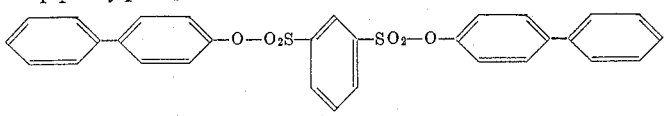

diphenyl benzene-p-disulfonate
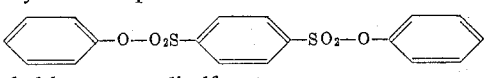

dimethyl benzene-m-disulfonate
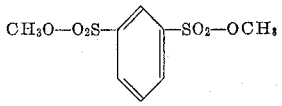

dicyclohexyl benzene-m-disulfonate
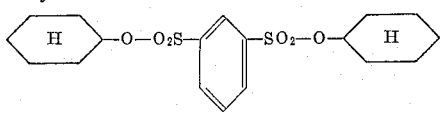

dilauryl benzene-m-disulfonate
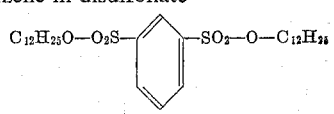

di-α-naphthyl benzene-m-disulfonate
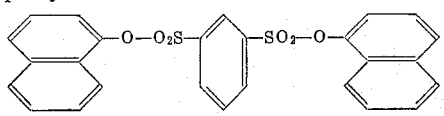

diphenyl naphthalene-1,4-disulfonate
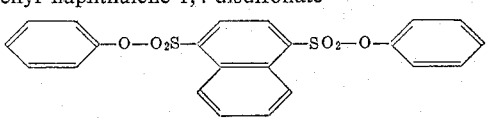

di-p-chlorophenyl naphthalene-2,7-disulfonate
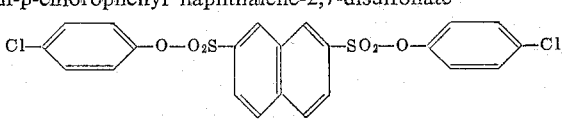

diphenyl diphenylether-p,p'-disulfonate
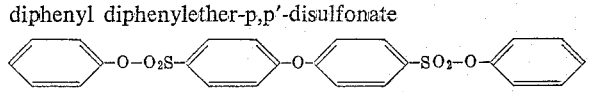

dicyclohexyl diphenylmethane-p,p'-disulfonate
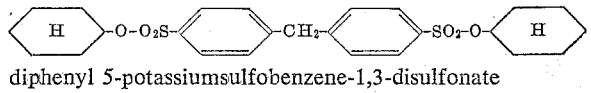

diphenyl 5-potassiumsulfobenzene-1,3-disulfonate
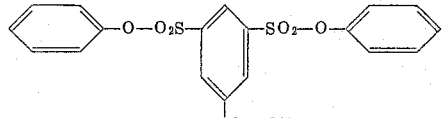

Compounds belonging to Formula Ib (when $n=2$):
ethylene di-p-toluenesulfonate
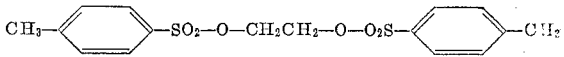

isopropylidene-p,p'-diphenylene di-p-toluenesulfonate ethylene dimethanesulfonate $$CH_3SO_2-O-CH_2CH_2-O-O_2SCH_3$$

p-phenylene di-p-toluenesulfonate methylene-p,p'-diphenylene dibenzenesulfonate 4,4'-di-(hydroxyphenyl-) sulfone dibenzenesulfonate 1,5-naphthylene dimethanesulfonate p-xylylene di-p-toluenesulfonate Compounds belonging to Formula Ia (when $n=3$):
triphenyl benzene-1,3,5-trisulfonate trimethyl benzene-1,3,5-trisulfonate tri-p-tolyl naphthalene-1,3,6-trisulfonate Compounds belonging to Formula Ib (when $n=3$):
1,3,5-trihydroxybenzene tribenzenesulfonate 1,3,5-trihydroxybenzene trimethanesulfonate glycerol tri-p-toluenesulfonate Compounds belonging to Formula I (when $n=4$):
tetracyclohexyl naphthalene-1,3,5,7-tetrasulfonate tetraphenyl naphthalene-1,3,5,7-tetrasulfonate pentaerythritol tetramethanesulfonate pentaerythritol tetracyclohexanesulfonate (2) And as the compounds belonging to Formula II the following can be mentioned:

The following compound whose degree of polymerization is 3–4 consisting of a self-condensed polyester of p-hydroxybenzenesulfonic acid whose termini are sealed with phenol and benzenesulfonic acid.

The following compound whose average degree of polymerization is 3–4 consisting of a self-condensed polyester of p-hydroxybenzenesulfonic acid whose termini are sealed with p-phenylphenol and methanesulfonic acid.

(3) As compounds belonging to Formula III the following can be named:

The following compound whose degree of polymerization is 3–4 consisting of a polyester of resorcinol and benzene-m-disulfonic acid whose termini are sealed with phenol.

The following compound whose average degree of polymerization is 5–6 consisting of a polyester of "Bisphenol-A" and benzene-m-disulfonic acid whose termini are sealed with phenol and benzenesulfonic acid.

In general, the preparation of the polyesters of organic acids is divided into two steps, of which the first is the step in which intermediates of relatively low molecular weight are prepared by reacting in the presence of a known catalyst a dibasic acid or its functional derivatives with a dihydric alcohol or its functional derivatives such as, alkylene carbonates, etc., or by self-condensing an oxycarboxylic acid in the presence of a known catalyst; and a second step in which these intermediates are reacted further under reduced pressure or in the presence of a stream of inert gas whereupon the high polymers having the ability of forming fibers or films are prepared.

These reactions may be either carried out by the continuous process or the batch process.

According to the above-described method the polyesters of organic acids are obtained as a homopolymer, a copolymer or a block copolymer.

On the other hand, as already described, polycarbonates are obtained by reacting an aliphatic glycol and a divalent phenolic compound such as, hydroquinone or "Bisphenol-A" either with phosgene in the presence of an alkali, or with a carbonic acid derivative such as diphenyl carbonate in the presence of a suitable ester-interchange catalyst, the reaction usually being carried out in a single step.

The aforesaid additives as employed in the invention may be added to these polyester-forming reactions at any stage thereof.

When the additive is added at a relatively early stage in the polyester-forming reaction and thereby caused to come into contact with a large amount of dihydric alcohol for a long period of time and at a high temperature, part of the dihydric alcohol may polymerize thereby forming an ether glycol component such as diethylene glycol or triethylene glycol which is introduced into the main chain of the product polyester, whereby a lowering of the softening point of said polyester composition is obtained. However, if the addition of the additive to the reaction system is effected at a relatively late stage of the polymerization reaction or the additive is mixed with a molten or solid polyester the polymerization reaction of which has been completed, lowering in the softening point of the obtained polymer is seldom seen.

Again the "polyester" to be mixed with one of the aforesaid additives is not limited to the aforesaid homopolymers, copolymers or block copolymers, but can be a mixture of more than one type of polyesters or a mixture of a polyester with another polymer or polymers.

With these additives which are readily mixed uniformly in the polyesters the dyeability with respect to dispersed dyes of the polyester compositions obtained can be improved conspicuously.

Inasmuch as generally in the case of the organic acid polyesters as well as in the case of the polycarbonates the forming reaction is usually carried out at about 250° to 300° C., it is desired that the additive to be used in the present invention be those among the compounds having either the aforementioned Formula I, II or III that are substantially stable at the above reaction temperature conditions. In view of this fact, among the additives of the invention, the aromatic esters of sulfonic acid, i.e., those in which X in Formula Ia is an aromatic group or those in which Y in Formula Ib is an aromatic group or those in which A, A′ and X′ or Y′ in case of Formulae II and III, are aromatic groups, are particularly desirable. According to the invention the aforesaid additive may be added so that the sulfonic acid ester bond may be contained in the polyester composition in a suitable quantity within the range of 0.1 to 20 mol percent, preferably 0.5 to 10 mol percent, of the carboxylic acid ester bond contained in the polyester.

When the additive as used in the present invention is contained in an amount so that the sulfonic acid ester bond is less than 0.1 mol percent of the carboxylic acid ester bond contained in the basic polyester, the intended improvement in dyeability is not achieved to an extent as to be satisfactory. On the other hand, when it exceeds 20 mol percent, the improvement in the dyeability of obtained polyester composition is not much, however, the physical properties such as the crystallinity, the softening temperature, etc., of said polyester composition are adversely affected. Therefore, it is preferred that the amount of additives to be added be held within the range mentioned above.

The staple fibers obtained by melt spinning the polyester compositions of the present invention not only exhibit excellent dye affinity, as already mentioned hereinbefore, but also, as described in the following examples, by the suitable selection of the conditions of spinning and subsequent treatments, the fabric woven from this staple fiber has a remarkable property in that the occurrence of pilling becomes exceedingly rare.

Furthermore, in accordance with what is known in the art, additives of an auxiliary nature may be added, namely, delustrants such as titanium dioxide, stabilizers such as phosphorous acid and the derivatives thereof.

The following examples illustrate the nature of the invention. It is to be understood however that these examples are given merely for purpose of illustration and is not intended to limit the invention in any manner whatsoever.

In the following examples the parts and percentages, unless otherwise indicated, represent parts by weight and percentages by weight. And the intrinsic viscosity [$\eta$] is a value determined using ortho-chlorophenol as the solvent at a temperature of 35° C.

EXAMPLE 1

*Synthesis of diphenyl benzene-m-disulfonate*

500 parts of benzene-1,3-disulfonylchloride and 350 parts of phenol were dissolved in 600 parts of acetone and cooled to 0° C., following which 970 parts of 25% NaOH aqueous solution was gradually poured therein. After completion of the pouring, followed by reacting for an hour, the reaction product was poured into 6000 parts of water, and the precipitate formed was filtered. After being washed thoroughly it was recrystallized from methanol. Diphenyl benzene-m- disulfonate (M.P. 83.5–84.0° C.) was obtained with a yield of 68%.

*Preparation of a polyester composition*

A reaction vessel connected with a distillation column was charged with 970 parts of dimethyl terephthalate, 690 parts of ethylene glycol and 0.88 part of calcium acetate, and the mixture was heated with stirring. After the methanol formed was distilled off, the product was transferred to an autoclave, then 9.7 parts of diphenyl benzene-m-disulfonate obtained by the above-described method, 0.3 part of antimony trioxide, 0.5 part of phosphorous acid and 5 parts of titanium dioxide were added, and the mixture was heated to 270° C.

As the reaction proceeded, the pressure was gradually reduced, and finally the reaction was carried out for 90 minutes at 0.2 mm. of mercury. The polymer obtained had an [η] of 0.55, a softening point of 248.5° C. and was a solid of excellent white color. When this polymer composition was melt-spun at 280° C. with a spinning speed of 1000 m./min., an undrawn filament of 9.6 denier was obtained.

This yarn was bundled as to result in a total denier of 300,000 and then drawn at the rate of 80 m./min. between two rollers adjusted for an elongation rate of 4.0 times using a hot water bath of 75° C. The yarn after being imparted 12 crimps/inch in a stuffing box type crimper and thereafter heat treated with dry heat at 145° C. for 15 minutes had a denier of 2.98, a tenacity of 3.57 grams/denier, an elongation of 46% and a shrinkage in boiling water of 0%. This tow was cut into staple fibers 3 inches in length and spun, to obtain a yarn having the following properties:

Cotton count—30/2 S.
Turn of twists—
   Under twist: 18T/in.
   Upper twist: 19T/in.

This spun yarn was woven into fabric with the following conditions:

Fabric structure—gabardine
Fabric density—
   Warp: 104/in.
   Weft: 56/in.

When this fabric, without being given finishing treatments, was subjected to a rotary treatment for 30 minutes in a tumbler type pilling tester it showed a value of 0 pillings/5×5 cm.². And when this fabric was dyed for 90 minutes at 96–97° C. in a 4% bath of Dispersol Scarlet B 150 pf., it dyed a deep color.

Moreover, no pillings at all were observed in a trouser sewn using this fabric, even though worn for three months.

On the other hand, for purpose of comparison, in a fabric woven from polyethylene terephthalate exhibiting an intrinsic viscosity of 0.53 which was obtained without the addition of diphenyl benzene-m-disulfonate there occurred 35 pillings/5×5 cm.².

The wearing test also revealed that the occurrence of pilling was extremely great. This fabric was dyed under identical conditions, but it only dyed lightly.

EXAMPLE 2

A reaction vessel connected with a distillation column was charged with 970 parts of dimethyl terephthalate, 690 parts of ethylene glycol and 0.88 part of calcium acetate, and the mixture was heated with stirring. After the methanol formed wase distilled off, the product was transferred to an autoclave, then 0.3 part of antimony trioxide, 0.5 part of phosphorous acid and 5 parts of titanium dioxide were added, and the mixture was then heated under normal pressure until the temperature of the reaction mixture reached 240° C., whereby glycol was distilled off.

Next, after adding and mixing with stirring 27.2 parts of di-p-phenylphenyl benzene-m-disulfonate, the temperature was raised to 270° C. while gradually reducing the pressure, and in the final stage the reaction was carried out for 90 minutes at 270° C. The polymer composition so obtained had an [η] of 0.60 and a softening point of 257° C. When this polymer composition was melt-spun as in Example 1, an undrawn filament having a denier of 9.0 was obtained.

This starting yarn was bundled as to result in a total denier of 350,000 and then drawn at the rate of 80 m./min. between two rollers adjusted for an elongation rate of 3.8 times using a hot water bath of 80° C.

The yarn obtained by treatment thereafter as in Example 1 had a denier of 3.00, a tenacity of 3.68 g./d. an elongation of 50% and a shrinkage in boiling water of 0%. This tow was cut into staple fibers 3.0 inches in length and spun to obtain a polyester composition spun yarn of 30/2 S. cotton count and having under twist of 19.0 T/in. and a upper twist of 18.2 T/in. was obtained.

When this spun yarn was woven into a tropical fabric having a density of 52 strands/inch for both warp and weft and without imparting finishing treatments was treated for 30 minutes in a tumbler type pilling tester, the occurrence of pilling was 3 pillings/5×5 cm.², while the occurrence of pillings in a fabric woven from polyethylene terephthalate having an intrinsic viscosity of 0.58 was 17 pillings/5×5 cm.². Moreover, the results after using both as sports wear for a period of two months showed that pillings did not occur at all in case of the fabric woven of the polyester composition of the present application whereas in case of the fabric of polyethylene terephthalate that was not modified showed an extreme occurrence of pilling.

Further, when this fabric woven from the polyester compositions containing di-p-phenylphenyl benzene-m-disulfonate was dyed as in Example 1 it could be dyed a deep color.

EXAMPLE 3

*Synthesis of isopropylidene-p,p'-diphenylene di-p-toluenesulfonate*

57.1 parts of "Bisphenol-A" and 95 parts of p-toluene sulfochloride were dissolved in 150 parts of acetone and cooled to 0° C., following which 130 parts of a 25% NaOH aqueous solution was gradually poured therein. After completion of the pouring and reacting for an hour, the reaction product was poured into 3000 parts of water and the resulting precipitate was filtered and then after being washed thoroughly was recrystallized from 1:1 methanol-acetone mixture. Iso-propylidene-p,p'-diphenylene di-p-toluenesulfonate (M.P. 110–111° C.) was obtained. The yield was 91%.

*Preparation of a polyester composition*

A reaction vessel connected with a distillation column was charged with 970 parts of dimethyl terephthalate, 690 parts of ethylene glycol, 0.33 part of zinc acetate and 26.7 parts of isopropylidene-p,p'-diphenylene di-p-toluenesulfonate, which was then heated with stirring. After the methanol formed was distilled off, the product was transferred to an autoclave, then 0.3 part of antimony trioxide, 0.5 part of phosphorous acid and 5 parts of titanium dioxide were added thereto, and the mixture was heated to 270° C.

As the reaction proceeded, the pressure was gradually reduced, and finally the reaction was carried out for 140 minutes at 0.2 mm. of mercury. The polymer composition obtained had an [η] of 0.62, a softening point of 240° C. and was a solid of white color.

The staple fiber obtained by doing as in Example 1 had a tenacity of 3.5 grams/denier, an elongation of 47% and when dyed for 90 minutes at 96–97° C. in a 4% bath of Dispersol Scarlet B 150 pf. dyed a deep color. Moreover, a fabric woven therefrom showed hardly any occurrence of pilling.

EXAMPLE 4

An autoclave connected with a distillation column was charged with 1200 parts of terephthalic acid, 900 parts of ethylene glycol and 0.4 part of calcium acetate. After substitution of the system with nitrogen gas, the mixture was heated with stirring under a gauge pressure of 23 kg./cm.² of the nitrogen.

The pressure that increases with the rise in temperature was removed by means of a vent valve, and the pressure was maintained constantly at 2.3 kg./cm.² during the reaction. With the rise in the inside temperature, water formed was distilled off. After the inside pressure dropped with the stoppage of the distillation off of water, the reaction was continued for another 20 minutes. The reaction product was then transferred to another autoclave, and after adding 37 parts of di-p-phenylphenyl benzene-m-disulfonate, 0.3 part of antimony trioxide and 0.3 part of phosphorous acid, it was heated to 270° C.

As the reaction proceeded, the pressure was gradually reduced until it was finally 0.2 mm. of mercury, at which the reaction was continued for 120 minutes.

The resultant polymer composition was a white solid having an [η] of 0.68 and a softening point of 251.7° C. The fiber obtained by spinning and drawing as in Example 1, when dyed as in Example 1, dyed a deep color.

EXAMPLES 5–12

970 parts of dimethyl terephthalate and 690 parts of ethylene glycol were mixed, and after effecting ester-interchange reactions as in Example 1 employing the ester-interchange catalysts as listed in the second column of the following table, various types of modifiers as listed in the third column of said table and 0.4 part of antimony trioxide were added, following which the ethylene glycol was distilled off. Then the polymerization reaction was carried out for 90 minutes at 270° C. in vacuo of 0.1 mm. of mercury. The various properties of the thus obtained eight types of polymer compositions are presented in the fourth column et seq. of the following table as Example Nos. 5–12. All determinations were in accordance with the methods as described in Example 1. In the table, part of the additive is that by weight.

EXAMPLE 15

40.1 parts of isopropylidene-p,p'-diphenylene di-p-toluenesulfonate together with 970 parts of dimethyl terephthalate, 90 parts of dimethyl diphenylmethane-p,p'-dicarboxylate, 1260 parts of ethlene glycol and 0.3 part of zinc acetate were reacted as in Example 1, except that in the final stage the reaction was carried out for 140 minutes at 275° C. and 0.2 mm. of mercury. When the resultant polymer composition was made into a film in accordance with accepted practices and dyed as in Example 1, an extremely deep colored film was obtained.

EXAMPLE 16

A reaction vessel connected with a distillation column was charged with 980 parts of methyl p-β-hydroxyethoxybenzoate, 650 parts of ethylene glycol, 880 parts of dimethyl terephthalate, 0.3 part of manganous acetate and 0.3 part of antimony trioxide. After completion of the distillation off of the methanol formed, 15 parts of triphenyl benzene-1,3,5-trisulfonate and 0.6 part of triphenyl phosphite were added to the reaction product, which was then heated to 270° C. and reacted for 150 minutes under a reduced pressure of 0.1 mm. of mercury, whereby was obtained a polymer composition having an [η] of 0.57. When this polymer composition which was spun and drawn as in Example 1 was dyed similarly as in said example, it dyed a remarkably deep color.

EXAMPLE 17

A reaction vessel connected with a distillation column

| Example No. X | Ester-interchange catalyst | Part | Additive | Part | Softening point (° C.) | [η] | Dyeability |
|---|---|---|---|---|---|---|---|
| Control | Ca(OAc)₂ | 0.88 | None | | 262.3 | 0.63 | Poor. |
| 5 | Mg(OAc)₂ | 0.54 | Diphenyl benzene-m-disulfonate | 19.5 | 254.9 | 0.65 | Good. |
| 6 | Ca(OAc)₂ | 0.88 | diphenyl 5-potassiumsulfobenzene-1,3-disulfonate. | 19.3 | 253.7 | 0.59 | Very good. |
| 7 | Zn(OAc)₂ | 0.33 | p-Phenylene di-p-toluenesulfonate | 20.9 | 256.0 | 0.61 | Do. |
| 8 | Ca(OAc)₂ | 0.88 | do | 62.7 | 251.3 | 0.60 | Excellent. |
| 9 | Ti(OBu)₄ | 0.2 | di-p-phenylphenyl benzene-m-disulfonate | 27.6 | 248.7 | 0.68 | Very good. |
| 10 | Zn(OAc)₂ | 0.33 | p-Phenylphenyl p-toluenesulfonate | 16.2 | 249.8 | 0.64 | Good. |
| 11 | Zn(OAc)₂ | 0.33 | Isopropylidene-p,p'-diphenylene di-p-toluenesulfonate. | 26.7 | 254.0 | 0.58 | Very good. |
| 12 | Zn(OAc)₂ | 0.33 | do | 53.5 | 250.2 | 0.56 | Excellent. |

EXAMPLE 13

A reaction vessel was charged with 1550 parts of dimethyl terephthalate, 1450 parts of 1,4-dihydroxy methylcyclohexane and 0.8 part of tetraisopropyl titanate. The mixture was heated with stirring, and the methanol formed was distilled off. Then 30 parts of diphenyl benzene-m-disulfonate and 7 parts of titanium dioxide were added to the above reaction mixture, and the mixture was heated to 290° C., following which the pressure was gradually reduced until finally a pressure of 0.2 mm. of mercury was reached at which the reaction was continued for 120 minutes.

When the resultant polymer composition which was spun and drawn as in Example1 was similarly dyed as in said example, a deeply dyed yarn was obtained.

EXAMPLE 14

A reaction vessel connected to a distillation column was charged with 970 parts of dimethyl terephthalate, 690 parts of ethylene glycol and 0.8 part of calcium acetate and was heated with stirring. After the methanol formed was distilled off, the product was transferred to an autoclave. Then 10 parts of tetraphenyl naphthalene-1, 3, 5, 7-tetrasulfonate, 0.3 part of antimony trioxide and 0.3 part of phosphorous acid were added, and the mixture was heated to 270° C.

As the reaction proceeded, the pressure was gradually reduced until finally a pressure of 0.2 mm. of mercury was reached, at which the reaction was continued for 140 minutes. When the resultant polymer composition was spun and drawn in accordance with accepted practices, and the fiber obtained as dyed as in Example 1, it dyed a deep color.

was charged with 10 parts of diphenyl benzene-m-disulfonate together with 173 parts of adipic acid, 194 parts of hydroquinone diacetate and 0.1 part of zinc acetate. After having distilled off the acetic acid by heating with stirring, 0.4 part of germanium oxide was added, and the mixture was heated to 280° C., following which the pressure was reduced gradually and finally the reaction was continued for 80 minutes under a pressure of 0.5 mm. of mercury, whereby a polymer composition having an [η] of 0.39 was obtained.

On the other hand, a polymer having an [η] of 0.46 was prepared from 150 parts of dimethyl terephthalate, 110 parts of ethylene glycol, 0.3 part of zinc acetate and 0.3 part of germanium oxide. To this was added 83 parts of the above copolymer, which was then reacted for 40 minutes at 270° C. under a pressure of 0.2 mm. of mercury, whereby a yellow-colored polymer composition was obtained. When this was made into film in accordance with accepted practices and dyed as in Example 1, it was observed that it dyed a remarkably deep color.

EXAMPLE 18

A reaction vessel was charged with 228 parts of

"Bisphenol-A" 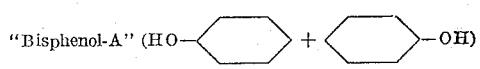

214 parts of diphenyl carbonate and 0.05 part of manganeous acetate. The mixture was heated in nitrogen current and the pressure was gradually reduced thereby distilling off the phenol formed. To this was added 26.7 parts of isopropylidene-p,p'-diphenylene di-p-toluenesulfonate, and gradually increasing the temperature the reaction was finally carried out for two hours at 290° C. at a pressure of 10 mm. of mercury, whereby was obtained a polymer composition. When this was made into a film in accordance with accepted practices and dyed as in Example 1, it was observed that it dyed a deep color.

EXAMPLE 19

A reaction vessel connected with a distillation column was charged with 970 parts of dimethyl terephathalate, 690 parts of ethylene glycol, 0.33 part of zinc acetate as well as 25 parts of a polysulfonate whose degree of polymerization is 3–4 consisting of a self-condensed polyester of p-hydroxybenzenesulfonic acid whose termini are sealed with phenol and benzenesulfonic acid. This mixture was heated with stirring, and after the methanol formed was distilled off, the product was transferred to an autoclave, in which it was heated to 270° C. after adding 0.3 part of antimony trioxide and 5.0 parts of titanium dioxide.

As the reaction proceeded, the pressure was gradually reduced until it finally reached 0.2 mm. of mercury, at which the reaction was continued for 120 minutes. The resultant polymer composition, when spun and drawn in accordance with accepted practices gave a yarn, which when dyed as in Example 1 dyed a deep color.

EXAMPLE 20

A reaction vessel was charged with 1550 parts of dimethyl terephthalate, 1450 parts of 1,4-dihydroxy methylcyclohexane and 0.8 part of tetraisopropyl titanate and heated with stirring thereby distilling off the methanol formed.

Then 35 parts of a polysulfonate whose degree of polymerization is 3–4 consisting of a polyester of resorcinol and benzene-m-disulfonic acid whose termini are sealed with phenol, and 0.6 part of antimony trioxide were added, and after heating the mixture to 280° C. the pressure was gradually reduced until finally 0.2 mm. of mercury was reached, at which the reaction was continued for 180 minutes.

When the yarn spun and drawn from the obtained polymer composition in accordance with accepted practices was dyed as in Example 1, a deeply colored yarn was obtained.

EXAMPLE 21

A reaction vessel connected with a distillation column was charged with 20 parts of diphenyl benzene-m-disulfonate together with 970 parts of dimethyl terephthalate, 690 parts of ethylene glycol and 0.33 part of zinc acetate, which was then heated with stirring. After the methanol formed was distilled off, the product was transferred to an autoclave and 0.4 part of antimony trioxide and 5.0 parts of titanium dioxide were added thereto, following which the mixture was heated to 270° C. As the reaction proceeded, the pressure was gradually reduced, and finally the reaction was carried out at 0.2 mm. of mercury for 90 minutes. The polymer composition thus obtained had an intrinsic viscosity of 0.62 and a softening point of 227° C. When this polymer composition was spun and drawn in accordance with accepted practices a white yarn was obtained, which, when dyed as in Example 1, dyed a deep color.

EXAMPLE 22

A reaction vessel connected with a distillation column was charged with 970 parts of dimethyl terephthalate, 690 parts of ethylene glycol and 0.8 part of potassium acetate and then heated with stirring. After the methanol formed was distilled off, the product was transferred to an autoclave, and 20 parts of diphenyl benzene-m-disulfonate, 0.4 part of antimony trioxide, 5.0 parts of titanium oxide and 0.4 part of phosphorous acid were added thereto, following which the mixture was heated to 270° C.

As the reaction proceeded the pressure was gradually reduced, and finally the reaction was carried out for 90 minutes at 0.2 mm. of mercury. The resultant polymer composition had an intrinsic viscosity of 0.63 and a softening point of 256° C. The yarn obtained by spinning and drawing this polymer composition in accordance with accepted practices, when dyed as in Example 1, dyed deeply.

EXAMPLE 23

A reaction vessel connected with a distillation column was charged with 970 parts of dimethyl terephthalate, 690 parts of ethylene glycol and 0.6 part of cobalt acetate and then heated with stirring. After the distilling off the methanol formed, the product was transferred to an autoclave, and 53.5 parts of isopropylidene-p,p'-diphenylene di-p-toluenesulfonate, 0.4 part of antimony trioxide, 5.0 parts of titanium dioxide and 0.4 part of phosphorous acid were added thereto, following which the mixture was heated to 270° C.

As the reaction proceeded, the pressure was gradually reduced, and finally the reaction was carried out for 90 minutes at 0.2 mm. of mercury. The resultant polymer composition had an intrinsic viscosity of 0.57 and a softening point of 256° C. The white yarn obtained from this polymer composition by spinning and drawing in accordance with accepted practices, when dyed as in Example 1, dyed a deep color.

EXAMPLE 24

A reaction vessel connected with a distillation column was charged with 970 parts of dimethyl terephthalate, 690 parts of ethylene glycol, 0.3 part of zinc acetate and 53.5 parts of isopropylidene-p,p'-diphenylene di-p-toluenesulfonate and then heated with stirring. After distilling off the methanol formed, the product was transferred to an autoclave, and 0.4 part of antimony trioxide, 5.0 parts of titanium dioxide and 0.4 part of phosphorous acid were added thereto, following which the mixture was heated to 270° C. As the reaction proceeded, the pressure was reduced gradually, and finally the reaction was carried out for 90 minutes at 0.2 mm. of mercury. The polymer composition thus obtained had an intrinsic viscosity of 0.58 and a softening point of 221° C. The white yarn obtained from this polymer by spinning and drawing in accordance with accepted practices, when dyed as in Example 1, dyed a deep color.

EXAMPLE 25

960 parts of polyethyleneterephthalate chips (softening point 263.1° C.; $[\eta]$ 0.57) melt polymerized in accordance with accepted practices using calcium acetate as the ester-interchange catalyst and antiomony trioxide as the polymerization catalyst were dried with hot air for 4 hours at 150° C. and was mixed immediately thereafter with 50 parts of diphenyl benzene-1,3-disulfonate.

This mixture, when melt-spun, drawn and heat treated in accordance with accepted practices, produced a yarn, which, when dyed for 90 minutes at 96–97° C. in a 4% bath of Dispersol Fast Scarlet B 150 pf., dyed a deep color.

For purpose of comparison, a yarn prepared by spinning, drawing and heat treating the same polymer as in the above without the addition of diphenyl benzene-m-disulfonate dyed only lightly.

EXAMPLE 26

10 parts of diphenyl benzene-m-disulfonate was mixed uniformly in 100 parts of a polycarbonate having a molecular weight of 32,000 prepared from "Bisphenol-A" by the conventional phosgene method. The yarn obtained by melt spinning the foregoing at 280° C., when dyed as in Example 1, dyed a deep color.

For purpose of comparison, a yarn from the same polymer used in the above prepared without the addition of diphenyl benzene-m-disulfonate dyed only faintly under the identical conditions.

Having thus described the invention, what we claim is:
1. A novel fiber-forming polyester composition having an improved dyeability which comprises
 (i) a linear fiber-forming polyester derived from the reaction of at least one acid component selected from the group consisting of terephthalic acid, functional derivatives thereof, and mixtures containing at least one of the foregoing acid components and a minor amount of an additional dibasic acid component or functional derivative thereof, with at least one glycol; and
 (ii) at least one organo sulfonic acid ester having the following formula:

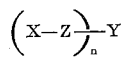

wherein Z is selected from the group consisting of the following radicals:

(a) $-\text{O}-\text{OS}_2-$ and (b) $-\text{SO}_2-\text{O}-$ $n$ is an integer of 1 to 4, X and Y are each selected from the group consisting of aliphatic hydrocarbon residues having from 1 to 12 carbon atoms and aromatic radicals having a nucleus selected from benzene and napthalene, said organo sulfonic acid ester being mixed such that the sulfonic acid bond is contained in said fiber-forming polyester in an amount of 0.1 to 20 mol percent of the carboxylic ester bonds contained in said fiber-forming polyester.

2. A novel fiber-forming polyester composition having an improved dyeability which comprises
 (i) fiber-forming polyethylene terephthalate and
 (ii) at least one organo sulfonic acid ester having the following formula:

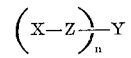

wherein Z is selected from the group consisting of the following radicals:

(a) $-\text{O}-\text{OS}_2-$ and (b) $-\text{SO}_2-\text{O}-$ $n$ is an integer of 1 to 4, X and Y are each selected from the group consisting of aliphatic hydrocarbons having from 1 to 12 carbon atoms and aromatic radicals having a nucleus selected from benzene and naphthalene, said organo sulfonic acid ester being mixed such that the sulfonic acid bond is contained in said polyethylene terephthalate in an amount of 0.1 to 20 mol percent of the carboxylic ester bonds contained in said polyethylene terephthalate.

References Cited by the Examiner
UNITED STATES PATENTS

| | | | |
|---|---|---|---|
| 2,474,350 | 6/1949 | Eilerman | 260—30.8 |
| 2,486,416 | 11/1949 | Jackson | 260—456 |
| 2,486,417 | 11/1949 | Jackson | 260—456 |
| 2,684,955 | 7/1954 | Knowles | 260—30.8 |
| 2,892,747 | 6/1959 | Dye | 260—75 |
| 3,018,272 | 1/1962 | Griffing | 260—49 |

SAMUEL H. BLECH, *Primary Examiner.*

WILLIAM H. SHORT, H. BURSTEIN, *Examiners.*

J. C. MARTIN, M. GOLDSTEIN, *Assistant Examiners.*